United States Patent
Wu et al.

[11] Patent Number: 6,005,682
[45] Date of Patent: Dec. 21, 1999

[54] RESOLUTION ENHANCEMENT BY MULTIPLE SCANNING WITH A LOW-RESOLUTION, TWO-DIMENSIONAL SENSOR ARRAY

[75] Inventors: Xiaodong Wu, Atherton; G. A. Neville Connell, Cupertino; Robert A. Street, Palo Alto, all of Calif.; Vittorio Castelli, Yorktown Heights, N.Y.; Harold M. Anderson, Ranchos Palos Verdes; Richard Weisfield, Los Altos, both of Calif.

[73] Assignee: Xerox Corporation, Stamford, Conn.

[21] Appl. No.: 08/485,847

[22] Filed: Jun. 7, 1995

[51] Int. Cl.$^6$ ........................................ H04N 1/04
[52] U.S. Cl. ........................... 358/474; 358/482; 358/483
[58] Field of Search ..................... 358/486, 493, 358/494, 496, 497, 474, 482, 483; 359/201, 202, 203, 211; 250/208.1, 234, 235

[56] References Cited

U.S. PATENT DOCUMENTS

| | | | |
|---|---|---|---|
| 4,168,126 | 9/1979 | Altman et al. | 356/386 |
| 4,923,263 | 5/1990 | Johnson | 350/6.9 |
| 5,267,056 | 11/1993 | Stemmle | 358/472 |
| 5,274,489 | 12/1993 | Smith et al. | 359/211 |
| 5,301,042 | 4/1994 | Blanding | 358/474 |
| 5,369,266 | 11/1994 | Nohda et al. | 250/208.1 |

*Primary Examiner*—Scott Rogers
*Assistant Examiner*—Stephen Brinich
*Attorney, Agent, or Firm*—Fay, Sharpe, Beall, Fagan, Minnich & McKee, LLP

[57] ABSTRACT

The system achieves high-resolution imaging with low-resolution two-dimensional imagers whose sensors are only a fraction of a selected pixel area. Sensors are stepped across an image with an optical or mechanical stepper to acquire an image at each sensor position. Thereby, resolution is defined by a step size which is comparable to the sensor size, rather than by pixel resolution. The system thus uses multiple image, obtained from individual sensors, which have a sensed area substantially less than the area of the pixels of the sensor array. Such rescanning is accomplished by movable mirrors or lenses that are disposed between an illuminated specimen and a sensor area.

23 Claims, 10 Drawing Sheets

$\theta$ = ARCTAN (1/3)
DIRECTION OF MOTION

RESOLUTION ENHANCEMENT BY MULTIPLE SCANNING WITH A LOW-RESOLUTION, TWO-DIMENSIONAL SENSOR ARRAY

BACKGROUND OF THE INVENTION

This application pertains to the art of electronic imaging, and more particularly to obtaining high-resolution images using relatively low-resolution image sensor arrays.

The invention is particularly applicable to digital image acquisition arrays that have a relatively small area from which they derive their information, which area is relative to an entire pixel area as defined on a specimen.

The invention will be described with particular reference to obtaining such a resolution translation. However, it will be appreciated that the invention has broader application such as obtaining additional or redundant information during the scanning process so as to allow a higher-definition or integrity image capture.

Much of the work associated with present-day image acquisition, manipulation, and printing is done via digitization. However, hard or printed copy is still an essential step in most applications.

Conversion between hard copy images and digital representations thereof are accomplished by scanners. Such scanners typically include a sensor array such as charge-coupled devices ("CCDs"). In such CCD arrays, a real image of a specimen is focused onto a planar array. Each CCD element of the array provides a digital signal representative of light exposed thereto. Fabrication techniques inherent in CCD construction provide a finite distance between respective elements of the array. Thus, each array element provides a digital signal representative of a sub-portion of the corresponding image resultant from the associated specimen. Information provided in image interstices is therefor lost. This results in lessened image integrity or degradation by loss of this associated, visual data.

The present invention contemplates a new and improved system which overcomes the above-referred problems, and others, and provides a digital image acquisition system which allows for capture of high-resolution images by use of multiple scan from sensors of individual sensor elements of sensor arrays.

SUMMARY OF THE INVENTION

In accordance with the present invention, an enhanced resolution image scanner includes an array of sensors. Each sensor of the array generates a signal representative of light energy focused on it. Light reflected from an associated specimen is communicated to the array of sensor elements. Each sensor element thereafter generates a signal representative of a corresponding picture element ("pixel"), of the associated image. Thereafter, the associated specimen is re-oriented relative to the sensor array. With such reorientation, each sensor element of the array obtains another signal representative of a second, unique portion of the same specimen. A combination of both data sets thereafter provides a high-resolution, digitized image of the associated specimen.

In accordance with a more limited aspect of the subject invention, the reorientation of the sensor array relative for the specimen for acquiring the second signal is done such that each sensor acquires a second reading taken from a different portion of the same pixel from which that sensor obtained the first reading. This is suitably accomplished by either rotating mirrors or rotating lenses disposed between the sensor array and the associated specimen.

In accordance with another aspect of the present invention, the second signal from each of the sensors is obtained from another pixel, other than that from which the particular sensor element obtained its first reading. This is suitably accomplished by mirrors disposed between the sensor array and the associated specimen. The movements of mirrors accomplish the required displacement.

An advantage of the present invention is the provision of a system by which higher-resolution image acquisition may be accomplished by a relatively coarse array of sensor elements.

Yet another advantage of the present invention is the provision of a system which matches actual acquired image data with the desired resolution of an associated, captured image.

Yet a further advantage of the present invention is the provision of an image acquisition system which provides additional or redundant information which is combined and provided in the resultant, capture image.

Further advantages will become apparent to one of ordinary skill in the art upon a reading and understanding of the subject specification.

BRIEF DESCRIPTION OF THE DRAWINGS

The invention may take physical form in certain parts, and arrangements of parts, preferred and alternative embodiments of which will be described in detail in this specification and illustrated in the accompanying drawings which form a part hereof and wherein.

DETAILED DESCRIPTION OF THE PREFERRED AND ALTERNATE EMBODIMENTS

Figure 1:
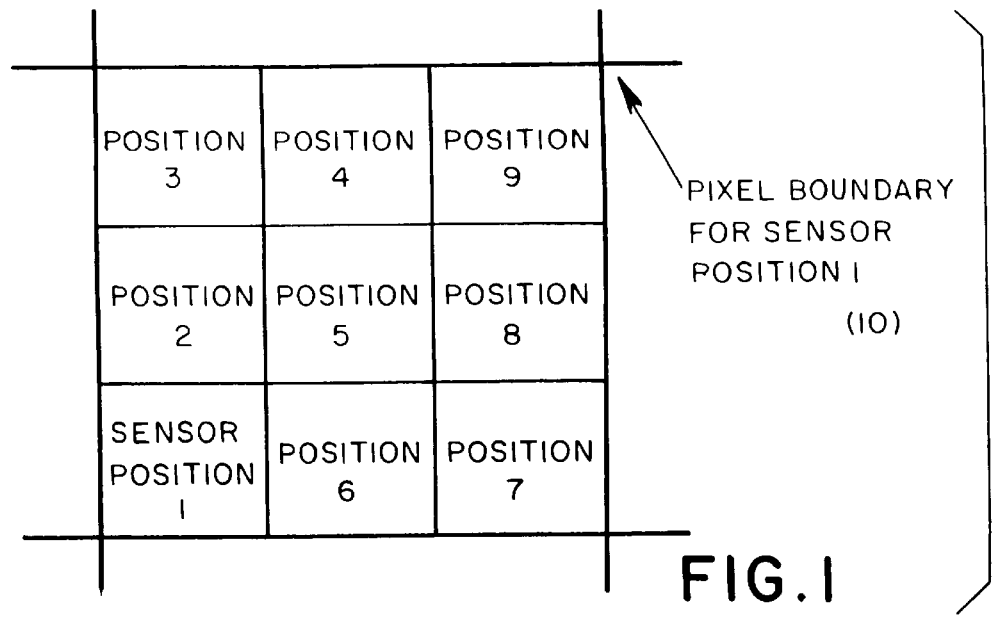
FIG. 1 illustrates 3× enhancement in effective resolution accomplished by stepping a sensor with respect to an image and doing multiple scans.

Turning now to the drawings wherein the purposes are for illustrating the preferred and alternate embodiments of the invention only, and not for the purposes of limiting the same, FIG. 1 illustrates the basic methodology by which 3-times ("3×") enhancement in effective resolution is accomplished by stepping a sensor with respect to an image and doing multiple scans. When a size of a sensor is smaller than that of a pixel in an array, a resolution of the sensor array is defined by the pixel size. The subject system modifies this. The resolution is thereby dictated by the sensor size instead by stepping the sensor such that an image is made with multiple scans.

As evidenced by FIG. 1, a pixel boundary for sensor position 1 on arbitrary sensor position 1 is depicted at 10. In FIG. 1, the sensor size is assumed to be equal to a step size. In an actual practice, it is advantageous to have a sensor size designed to be somewhat larger than a step size. With this, there is some overlap in a sampled image among neighboring pixels (after reconstruction with multiple scans). Such an overlap serves to reduce moire' effects in a resultant scanned image. For simplicity and clarity in the drawings, the sensor size is illustrated to be the same as the step size.

The subject application teaches several ways to translate an image with respect to a sensor array. For example, stepping a sensor to various positions 1–9 within the pixel boundary 10 is illustrated in FIG. 1. A first system that will be described includes a stepping-within-a-pixel method in which multiple positions of a single sensor cover a complete pixel area. A second system employs a super-pixel method. In this method, a super pixel is defined as several standard pixels. Sensor positions are patterned in a way chosen such that a linear translation of an image relative to a sensor array may be made. In both instances, a total area covered by a single sensor after completion of a scan process is larger or equal to the area of a pixel. First, the stepping-within-a-pixel method will be described in detail.

A stepping-within-a-pixel method serves to position an array with respect to an image such that the sensor areas cover a complete area of an array pixel, such as evidenced in FIG. 1. This is suitably accomplished with rotating glass wedges or rotating mirrors, both of which will be described below. It will be appreciated that any suitable optical manipulation can serve to accomplish the same result, such as by rotating a document and/or a sensor array in combination with a rotating wedge or a rotating mirror.

Figure 2:
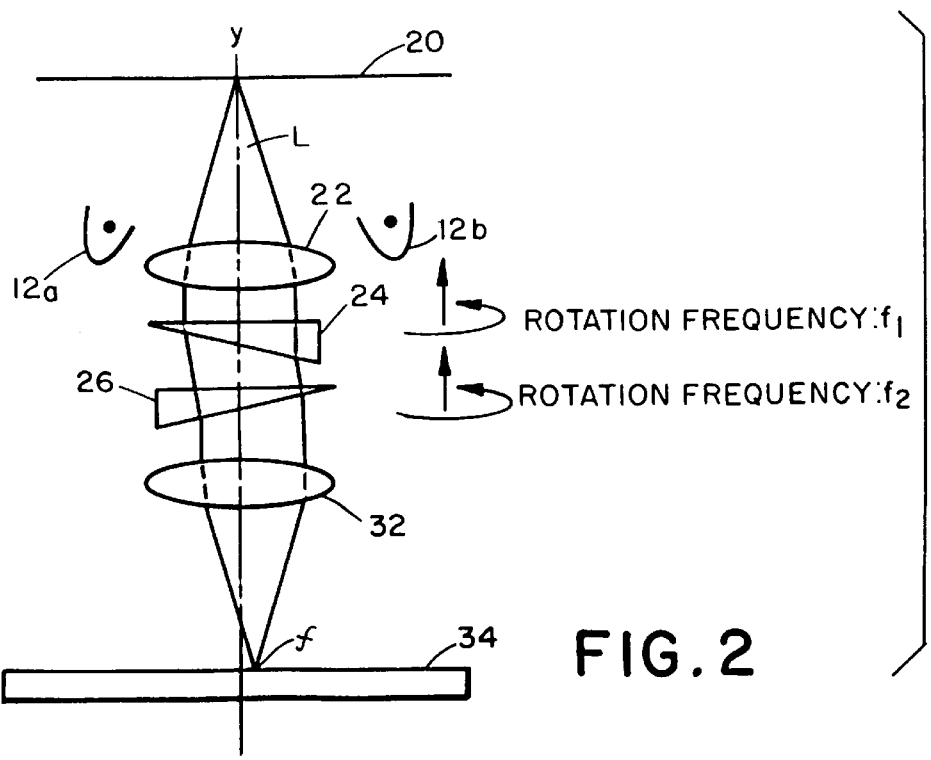
FIG. 2 illustrates a system for stepping an image of a document on a two-dimensional sensor array with two rotating wedges.

Turning to FIG. 2, an implementation employing a rotating wedge system will be described in detail. One way to translate an image of a document with respect to a sensor array is by steering an image of the original with two rotating glass wedges. FIG. 2 evidences this scheme. In the illustrated system, light from flash lamps 12a and 12b illuminate a document 20 is placed at one focal plane of a lens 22. Light reflected from a spot on the document is thereby collimated by lens 22. Thereafter, the light is bent by a series of translucent wedges 24 and 26 which share an optical path for light with a convex lens 22.

In the illustrated embodiment, wedges 24 and 26 are installed such that a top surface is generally perpendicular to an axis of rotation disposed at a center portion of each wedge. This advantageously coincides with an axis y of the common illumination path of light.

Figure 3:
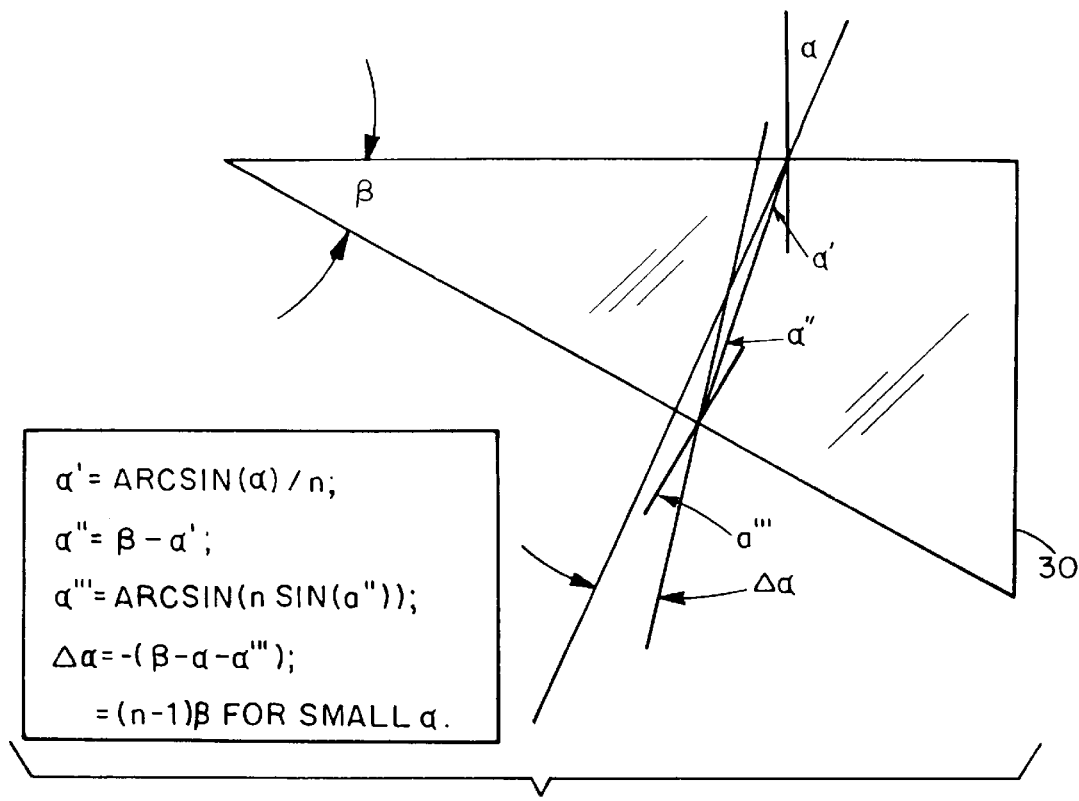
FIG. 3 illustrates light refraction as implemented in the structure of FIG. 2.

Turning to FIG. 3, illustrated is an effect of a refractive wedge on a parallel light beam. A total refraction of a light beam $\Delta\alpha$ is caused by a wedge 30 with a wedge angle $\beta$ and an index of refraction n is:

$\Delta\alpha=(n-1)\beta$, for small $\alpha$

It will be appreciated that the properties evidenced by FIG. 3 are experienced by both first and second wedges 24 and 26. It will be further appreciated that the bending $\Delta\alpha$ is independent of an angle of incidence $\alpha$, when $\alpha$ is small. In other words, a set-up is not sensitive to wobbling of the wedges. Turning again to FIG. 2, a second lens, illustrated as convex lens 32 results in a change of a beam angle that translates the image to a displacement of:

$d=F\Delta\alpha$ on the sensor array, where F is the total focal length of lens 32. For a 1:1 image magnification, a focal length of each of the two lenses is ideally identical.

Figure 4:
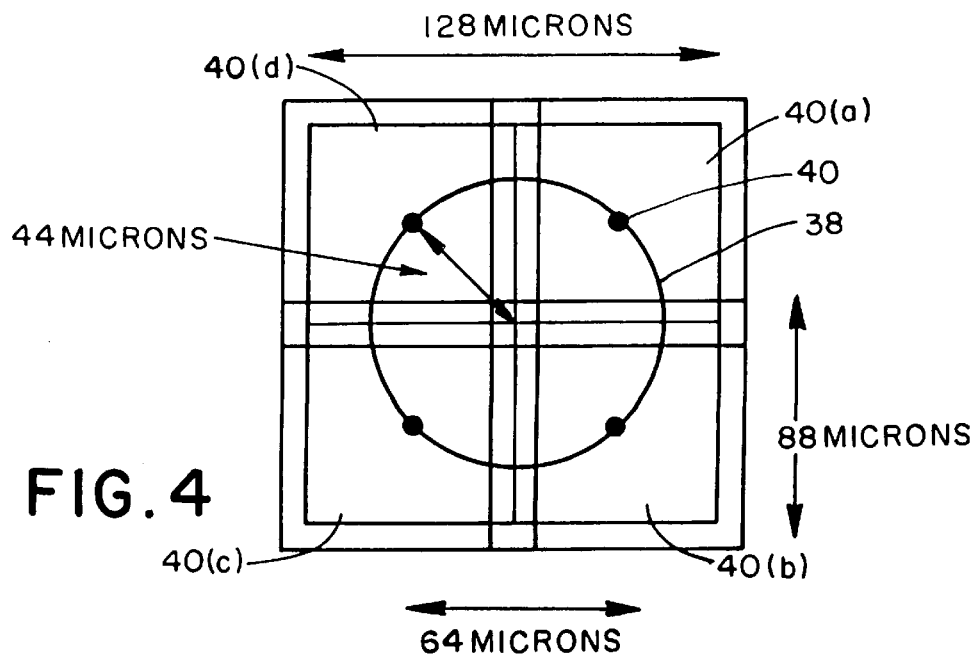
FIG. 4 illustrates sensor mapping for a 2× resolution enhancement operation.

By way of example, the system will be explained in conjunction with achieving a 2× enhancement of resolution. For a currently available 200 spi sensor array, a sensor size is typically 88 microns and a pixel size is 128 microns. By stepping a sensor into four quadrants of a pixel with the step size of 64 microns, one may acquire an image at an effective 400 spi resolution. To move a sensor into four symmetrical positions, one need only use a single rotating wedge. A trajectory of the sensor position on a document is evidenced by FIG. 4 by the circle 38. With a focal length of 30 cm., a selected wedge angle $\beta$ should be about 1.7 arcmin (arc minutes), assuming n=1.3. To complete an image scan, a flash lamp should then be flashed when a trajectory has moved to the four positions 40(a), 40(b), 40(c), and 40(d). These positions are evidenced by the dots 40 disposed on the circumference of the circle 38 in FIG. 4. When this is accomplished, the four frames are then combined to form a scanned image with an effective 400 spi resolution.

To achieve an enhancement higher than 2×, a suitable embodiment employs two rotating wedges as illustrated above. With this embodiment, the wedges are rotate at different speeds. A trajectory of a sensor within a pixel is a vector superposition of trajectories caused by each wedge. If a center position of a sensor is chosen by to be the origin of a Cartesian coordinate system (xy), its trajectory may be described as:

$x=A \sin(2\pi f_1 t)+B \sin(2\pi f_2+\Phi)$ ; and $y=A \cos(2\pi f_1 t)+B \cos(2\pi f_2+\Phi)$ In these equations, A and B are amplitudes of trajectory displacement, which is proportional to an angle of the wedges. The values $f_1$ and $f_2$ are rotation frequencies of wedge 24 and wedge 26 respectively. The value $\Phi$ (from the equation), is a phase difference between the wedges while t represents time.

For 3× enhancement in resolution, the following conditions apply:

A=B;

Φ=0; and $f_2=5f_1$

Figure 5:
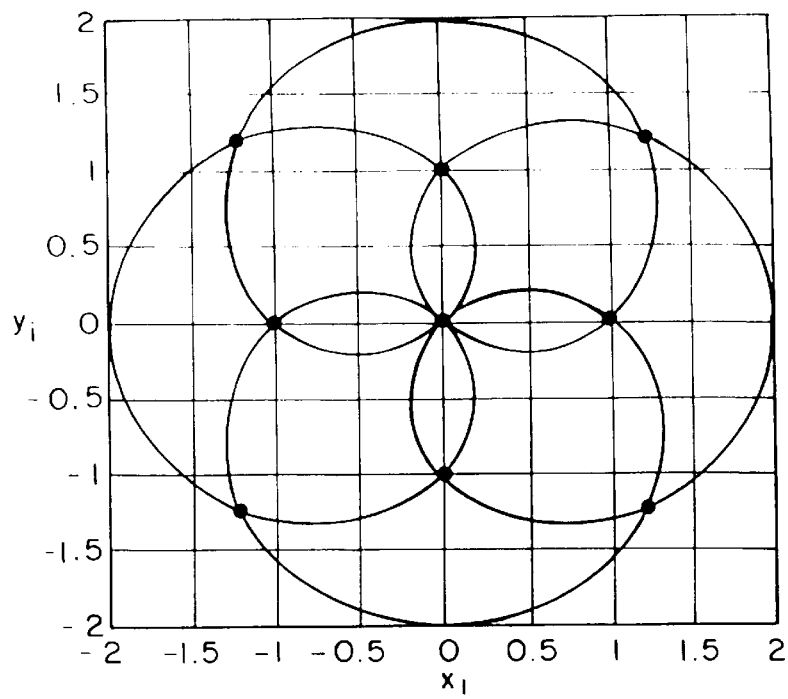
FIG. 5 illustrates a trajectory of sensor positions for a 3× resolution enhancement.

FIG. 5 illustrates a trajectory of a system as described above.

Figure 6:
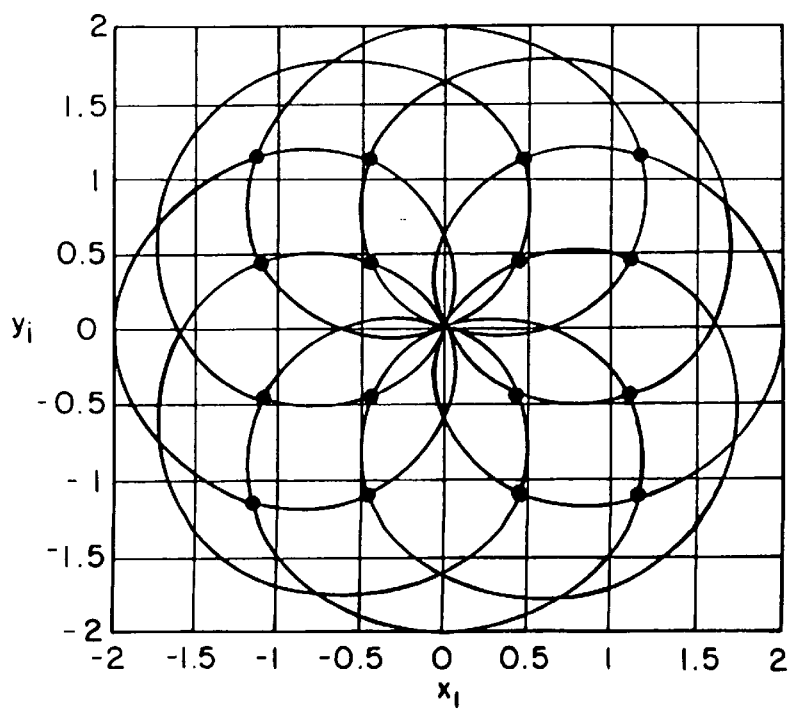
FIG. 6 illustrates a trajectory of sensor positions for a 4× resolution enhancement.

Turning to FIG. 6, a trajectory for a 4× resolution enhancement is described. With this system, the following operating conditions apply:

A=B;

Φ=0; and $f_2=9f_1$.

In both cases, with a correct control of flash lamp exposure timing, one may position a sensor to different places within a pixel. Although a trajectory in both cases does not put the sensor to positions on an exact grid, this feature is suitably implemented to randomize sampling points by adding random noise in a timing signal for flash lamps. This is useful to reduce Moire' patterns when a scanner is imaging a half-toned image. For accurate construction of an image grid, it is advantageous interpolate for values on the grid. It will be appreciated that using even higher frequencies than that noted above, while keeping with the symmetry of trajectory, allows one to have sensor positions much closer to a desired grid. This serves to render offsets in sensor position to have an unnoticeable effect.

Figure 7:
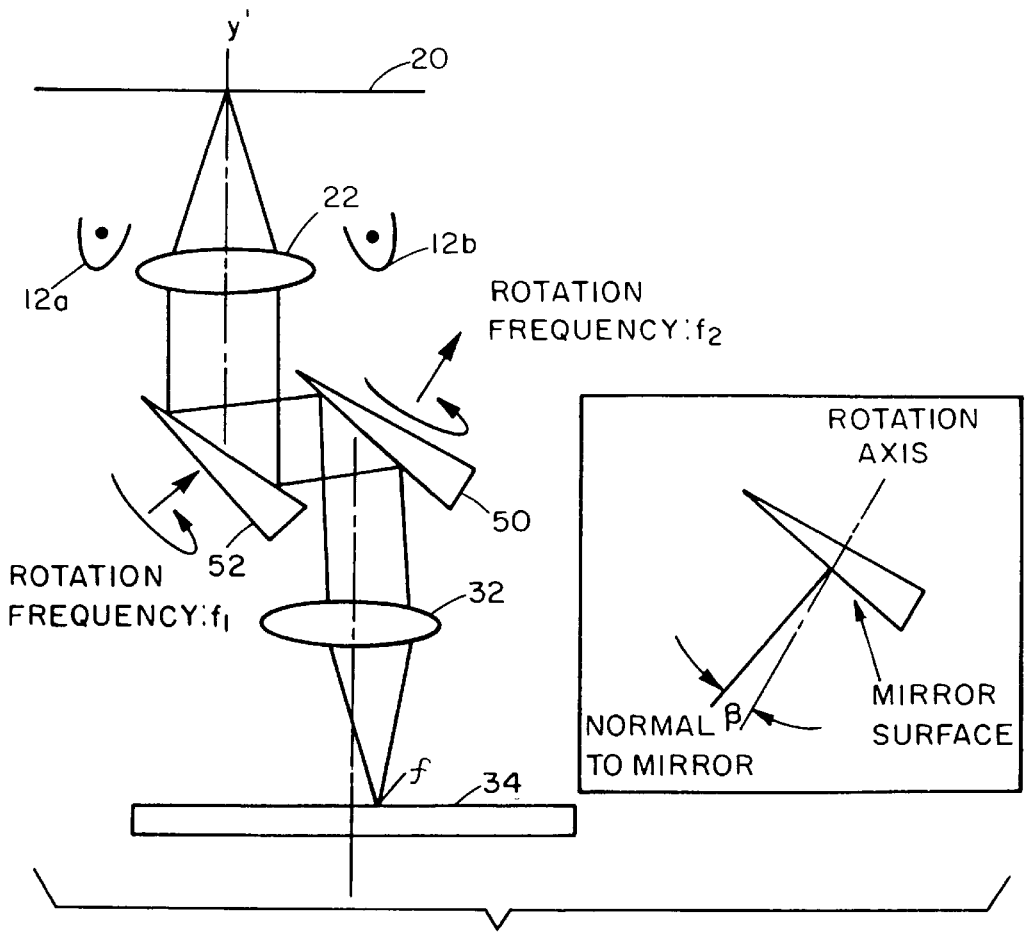
FIG. 7 illustrates a system for stepping an image of a document with a two-dimensional sensor array implemented with rotating mirrors.

Turning now to FIG. 7, an embodiment in which rotating mirrors are implemented instead of the rotating wedges described. It will be appreciated that the basic function of the wedges noted above is propagated forward, but being carried forward by reflective instead of refractive properties.

In the diagram of FIG. 7, similar elements to that provided in FIG. 2 have been provided with the same numbers. The basic distinction is in connection with the wedges 24 and 26 of FIG. 2 which have been replaced with mirrors 50 and 52 in FIG. 7. Thus, the mirrors serve to step the image. The common optical access y of FIG. 2 is analogous to an optical path y' in FIG. 7. Relative rotation frequencies in a two-mirror embodiment provide the same mathematical relationships disclosed above.

In addition to the foregoing, it will be appreciated that the same kind of image and motion may be achieved by moving either a document or a sensor array in a circular trace. It is also suitably implemented with a combination of a rotating wedge and a mirror. As long as two circular motion components at correct frequencies in a trajectory sensor movement are provided, the same effect is achieved. For example, suitable accommodations may suitably include (but are not limited to):

1. Moving both a document and a sensor array;
2. A moving document and a rotating wedge;
3. A moving document and a rotating mirror;
4. A moving sensory array and a rotating wedge; and
5. A moving sensor array a rotating mirror.

It will be recalled that for a 2× enhancement, one need only have one moving part in the system. It is suitably a circularly moving document, a circular moving sensing array, a rotating wedge, a rotating mirror, or the like.

Figure 8:
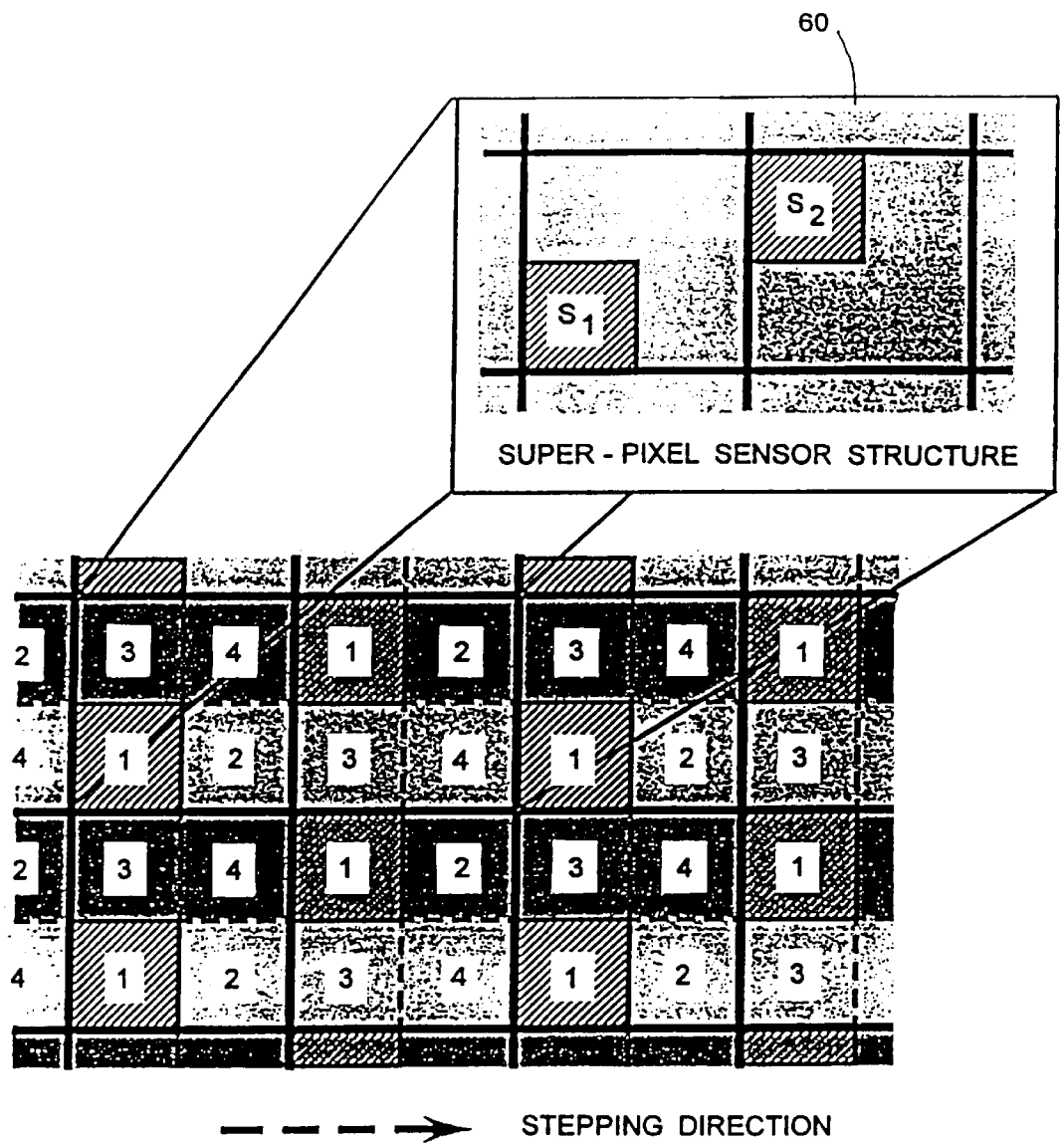
FIG. 8 illustrates a schematic for 2× resolution imaging of a document by multiple scanning with a super-pixel sensor structure, wherein the array is stepped horizontally.

Next, the super-pixel method noted above will be described in detail. The super-pixel method simplifies motion required to a one-dimensional translation. It provides a super-pixel design for a sensor array. With particular reference to FIG. 8, a scheme for a 2× resolution enhancement will be demonstrated. Such a super-pixel structure is evidenced in block 60. A super-pixel is suitably chosen with a size that is twice that of a conventional pixel. A sensor in a second pixel ($S_2$) of a super-pixel 6 is off-set upward by one step size with respect to the first sensor ($S_1$). By stepping four times horizontally and interleaving four frames of images together in correct order, one image is provided with twice the spatial resolution of the array. In this instance, no interpolation is required. Numbers in the dash box 62 indicate a desired sequence for stepping.

Figure 9:
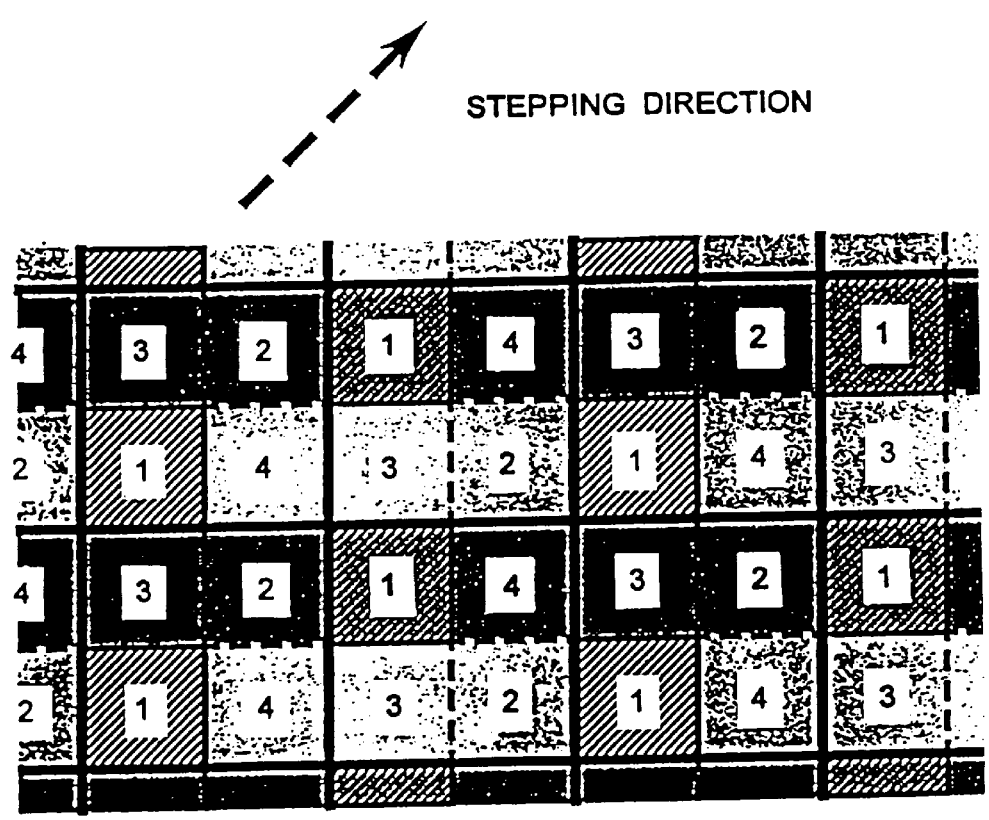
FIG. 9 illustrates a schematic for 2× resolution imaging of a document by multiple-scanning, implementing a super-pixel sensor structure with an array being stepped in a 45° angle with respect to gate lines or data lines.

FIG. 9 illustrates an alternative, super-pixel arrangement wherein the array is stepped at a 45° angle. In this instance, an appropriate complete image may be fabricated, again after interleaving.

Figure 10:
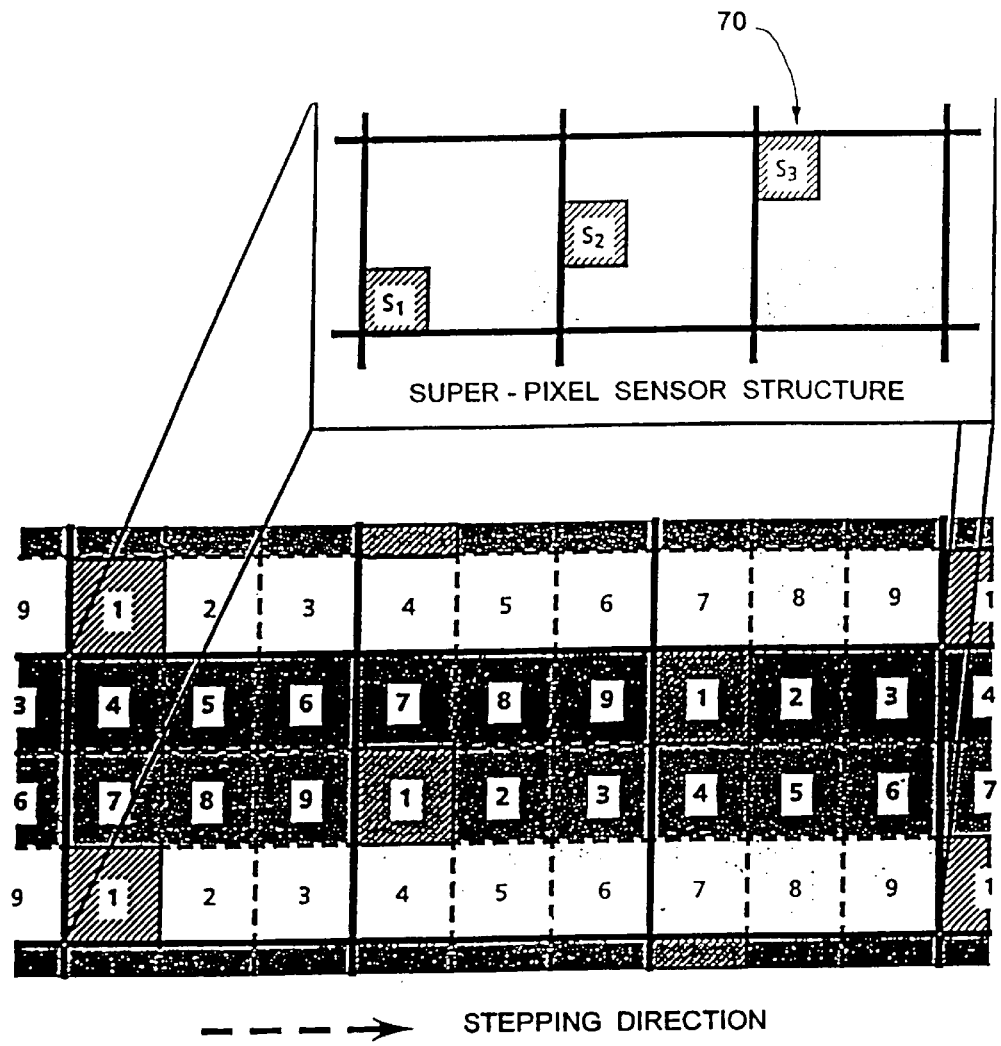
FIG. 10 illustrates 3× resolution imaging of a document by multi-scanning implementing a super-pixel sensor structure wherein the array is stepped horizontally.

FIG. 10 teaches a scheme to step an array to achieve a 3× resolution enhancement with horizontal stepping. A portion 80 evidences a structure of a super-pixel. From FIG. 10, it will be appreciated that one may also step an array at a 45° angle in a way similar to what is described with FIG. 9 above.

Figure 11:
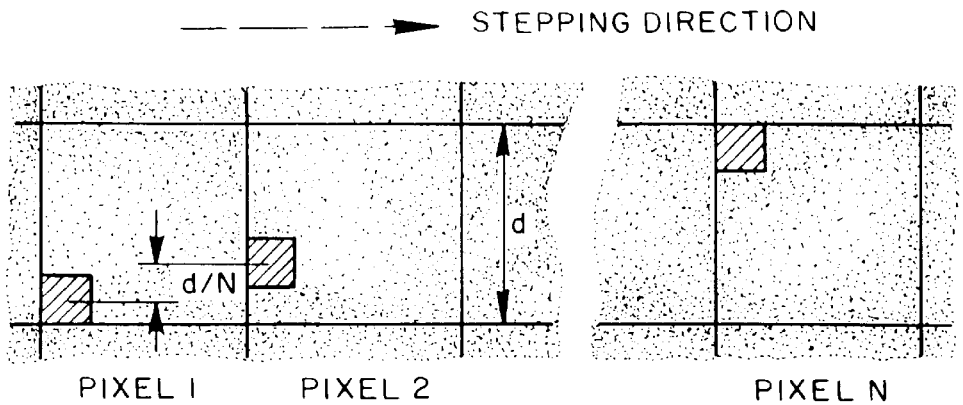
FIG. 11 illustrates a schematic of a super-pixel sensor structure for N× resolution enhancement wherein the array is stepped in a horizontal direction.

The super-pixel system described herein may be generalized to achieve any multiple (N) times resolution enhancement with an array of a given pixel resolution. For an N times resolution enhancement, one may suitably implement a super-pixel that has N neighboring pixels (see FIG. 11). Each pixel is provided with a square sensor that has a fill factor of $1/N^2$ or larger, for anti-aliasing purposes. The centers are positioned against one side of the pixels in which they reside with a vertical spacing of 1/N of a pixel size. A stepping direction is then chosen along a horizontal direction with a step size of 1/N of a pixel size. See FIG. 11.

One may suitably use space left uncovered by sensors to build electronics at a pixel level without affecting an image quality of the sensor array. The pixel level electronics can be used for image correction, data processing or the like. The remaining area is also suitably left transparent for back illumination as is used in contact imaging.

Figures 12, 13:
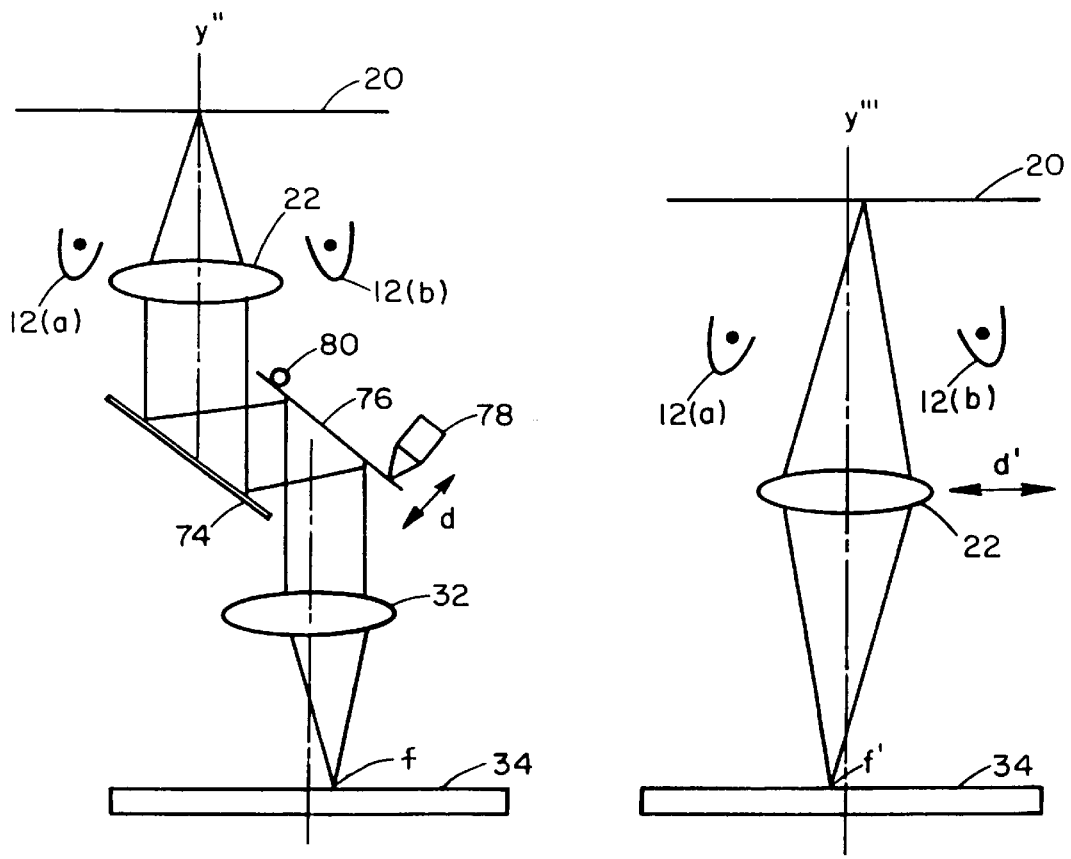
FIG. 12 illustrates a system for using a vibrating mirror to introduce a linear translation of a document image on a two-dimensional sensor array.
FIG. 13 illustrates a stepping of an image of a document on a two-dimensional sensor array with lateral translation of projection lens.

One embodiment of the invention is using vibrating mirrors to linearly translate an image with respect to a sensor array. In FIG. 12, the document 20 has light exposed thereto from flash lamps 12(a) and 12(b). Light directed from the flash lamps 12 is communicated to a document 20. Light reflected therefrom is communicated to from along optical axis y". Light focused there through lens 22 is provided to a fixed mirror 74 and reflected to a vibrating mirror 76. Vibration of the mirror 76 is accomplished with a pusher 78 disposed at a free moving end of the mirror 76 rotating around a pivot 80. The vibrator pivots the mirror in an arcuate direction d about the pivot 80.

Light reflected from the vibrating mirror 76 is communicated to lens 32 and thereby focused to sensor array 34. It will be appreciated from this description that the vibrating mirror 76 serves to alter a focal point f of light from lens 32 into varying positions along the sensor array 34.

In FIG. 13, another embodiment is disclosed. In this embodiment, as before, components that are similar in function to those described earlier have maintained their numbering schemes. Flash lamps 12(a) and 12(b) illuminate documents 20. Light reflected from document 20 is projected along an optical axis y'" and through a lens 22. Suitable means (not illustrated) are provided to laterally translate the lens 22 along a direction d', generally perpendicular to the optical axis y'". The reciprocal, linear motion of the mirror 22 along the direction d' allows for translation of the image.

Figure 14:
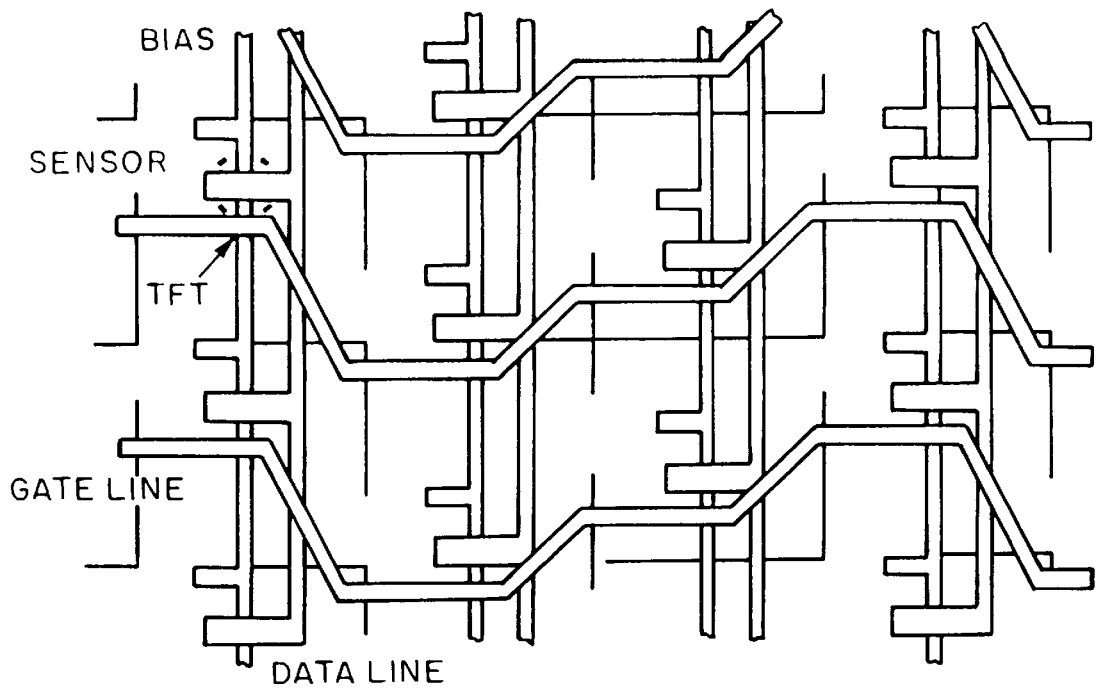
FIG. 14 provides a layout example of a super-pixel structure for a 3× resolution enhancement array.

FIG. 14 illustrates an example of a super-pixel design for 3× resolution enhancement. Super-pixel design for other enhancement ratios will also be similar in format to that in the illustration of FIG. 14. A primary consideration for super-pixel design is that one must meet design rules of fabrication. Thus, particulars are highly application specific, but follow from the illustrated example.

It will be appreciated that the illustrated super-pixel design of FIG. 14 provides a basic template for other enhancement ratios. Each particular super-pixel design is application specific and must meet design rules for fabrication. It will also be appreciated that additional attention must be made to ensure that each pixel has the same, or substantially the same, electrical properties, such as capacitance, parasitic effects, and the like. For an array made for contact imaging, it is advantageous that one made sure each sensor in a super-pixel structure has a similar transparent structure next to the sensor, as well as the same fill factor for a transparent region to ensure a uniform exposure of a document.

A horizontal stepping scheme has an advantage over diagonal stepping schemes, as well as those provided with rotating wedge(s) and/or mirror(s). The horizontal translation scheme involves linear motion and post-scan image processing is also rendered straightforward.

A horizontal translation scheme is suitably implemented by introducing linear motion with respect to a sensor array. This may be accomplished by mechanically moving the array or the document. The same effect may also be suitably achieved with a vibrating mirror. This particular architecture was described above in connection with FIG. 12.

Figure 15:
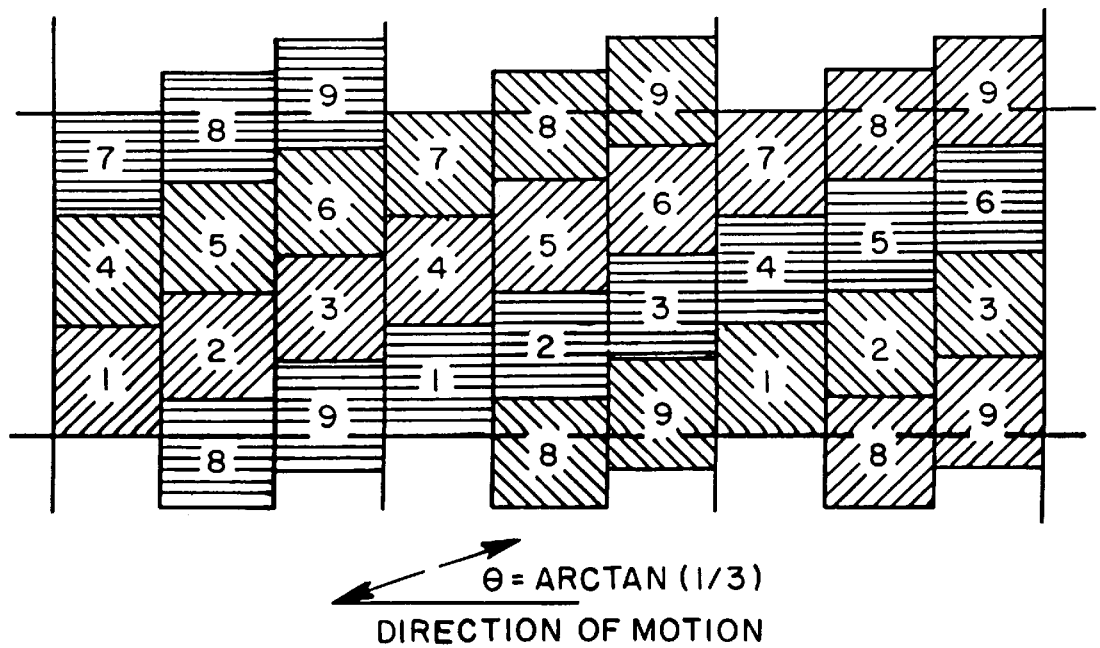
FIG. 15 illustrates a linear stepping of an array for a 3× resolution enhancement with a conventional pixel design.

A variation in a system for stepping an array linearly for higher resolution is provided in FIG. 15. This figure also evidences a 3× resolution enhancement. Again, it will be appreciated that the basic principle is the same for other ratios of enhancement. The array shown has a conventional, uniform pixel structure. In order to cover all imaged space within such an array, the array or image is stepped in an angle of 18.43° from a horizontal direction. A step size along the horizontal direction is ⅓ of a pixel size. In the figure the sensor does not coincide with a high resolution grid for six of nine step positions. Accordingly, an interpolation is provided for the scanned images (or exposures) onto the high resolution grid. This reduces the speed of an imager while allowing for use of concurrent imager designs at higher resolution.

In a general case, one may achieve an N times resolution enhancement with a conventional pixel design and a sensor size of d/N where d is a pixel size.

An array is stepped with respect to a document image at an angle θ equals arctan (1/N) and a horizontal step size of (d/N).

The subject system is also readily adapted to color-image scanning. The system provides for color-imaging of a document at a high resolution with a reduction in total image data. It is to be appreciated that the human visual system is much less sensitive to high frequency components of chrominant than that of luminant. Thus, reproduction of a color image with a satisfying quality may be provided with low-frequency samplings of chrominant components of an image. Image quality is contingent upon the means by which final output format is accomplished. Such means include color laser printers, video monitors, phototypesetters and the like. Since color imaging provides so much data, it is often advantageous to complete an undersampling of color primaries to reduce the data to be processed and increase the speed of an imager.

Figure 16:
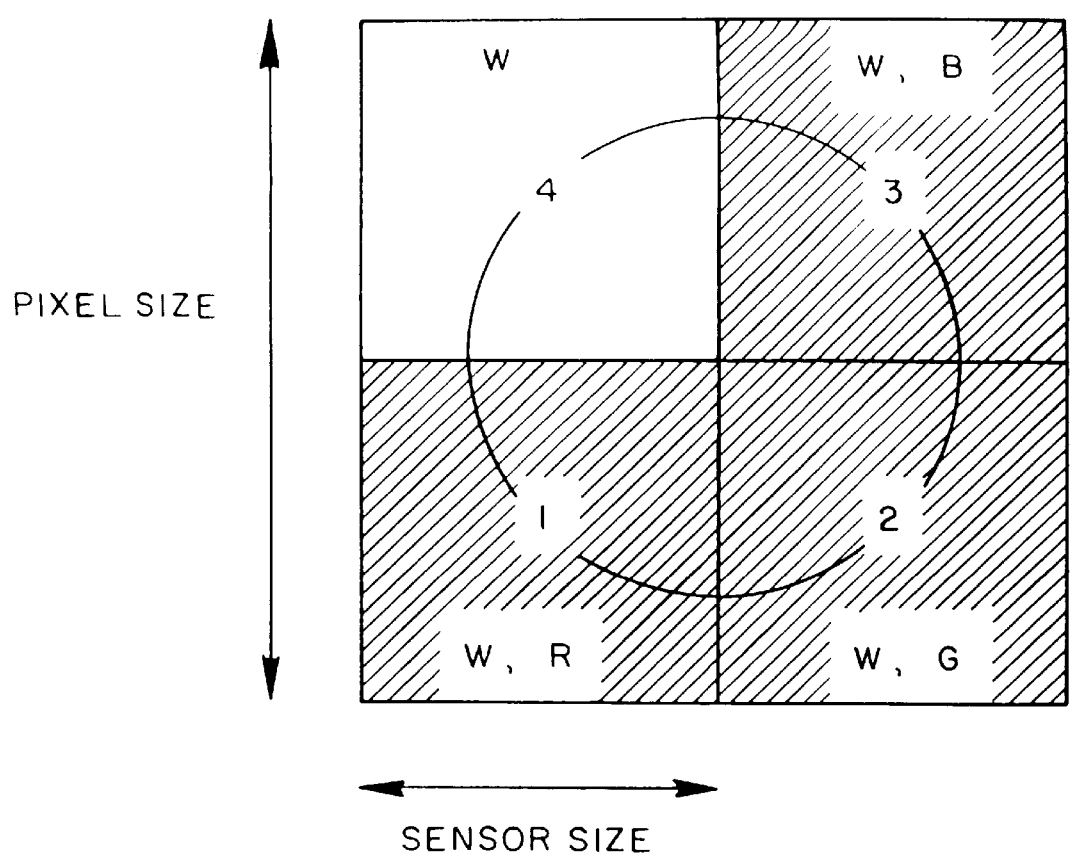
FIG. 16 illustrates a high-resolution color imaging with a reduced data rate.

An example of an implementation for a 2× resolution enhance color imaging scheme is provided in FIG. 16. In this system, the array or image is stepped with the pattern described above with the stepping-within-a-pixel scheme to enhance resolution. The pattern is stepped through a plurality of times to acquire colors primaries of the image. A higher ratio of resolution enhancement is obtained by employing a stepping pattern like that noted in FIG. 6 above. A suitable imaging system may be found with the schematics described in connection with FIGS. 2 and 7, above. It also is to be appreciated that color filters are switched in front of flash lamps in synchronization with the exposures.

Since the human visual system is less sensitive to high-frequency components of color image chrominant, the imager is first stepped through four sensor positions to acquire four frames of black and white images (using no color filters). On a second pass of the array stepping, the imager acquires red, blue and green primaries while the sensor is at position 1, 2, and 3 respectively. From the three primaries, the chrominant images u, v in the Luv system, are calculated. For an approximation, one may assume that the primary is acquired at different sensor positions given a reasonable representation of primaries of an entire pixel at the given pixel resolution. Thus, a high-resolution luminant image is provided from four frames of black and white images and two low-resolution chrominate images. Interpolation then provides a low resolution, u, v images to high resolution grids. Thus, provided as a complete color-imaging of a document with seven frames of images instead of 12 frames. A factor of 1.7 improvement in speed and data storage requirement therefore results. It is to be appreciated that the improvement in speed and storage increases for a higher ratio of resolution enhancement with the above-described implementation. However, the image quality of the scanned image will decrease correspondingly.

The color image, the example of FIG. 16 was provided with a 2× enhancement in resolution. While the chrominants are acquired at the lower resolution, the resultant image quality changing is often negligible for many applications, such as in color laser printing.

Color imaging is also suitably accomplished with rotating filters and linear motion stepping of a document image with respect to the sensor array, as described in detail below. As such an embodiment, one captures a black and white image of a document at a fully enhanced resolution with white illumination in a first pass of the reciprocal motion. Thereafter, one captures a red, a green and a blue image in a stepping position 1, 2 and 3 respectively in a second pass of the relative motion of the array. (Additional color primary sets may also be implemented). At this point, one may derive a high-resolution luminant image with a lower resolution chrominant image from lower resolution color images of the document.

Color exposures of a document are not limited to the above-described step positions 1, 2, and 3. Certain applications allow for a timing of color exposures or even an increase in number of color exposures to achieve better color reproduction. This system may be applied to both the above-described super-pixel structured array, as well as to a conventional array. As evidenced from FIGS. 8, 9, 10 and 15, it does not matter when the color exposures occur. When N, the resolution enhancement factor, is greater than 2, a suitable timing of color exposures may be chosen for an even distribution of chrominant sampling.

From the foregoing systems, it will be appreciated that fabrication difficulties limit ultimate pixel resolution of a two-dimensional sensor array. One may achieve much higher resolution imaging by imaging a document several times while moving a document image with respect to a sensor array. A resolution of the final, interpolated image has a resolution defined by a step size which is advantageously chosen to be comparable to the sensor size. Image movement may be introduced by either moving the document or array mechanically, or using rotating wedges or mirrors. A super-pixel structure with a small sensor size allows one to achieve a resolution much higher than pixel resolution without pushing design rules for an array. The disclosed system apply the high-speed advantage of a two-dimensional sensor array to improve resolution of an imaging system.

In addition, using a fact that human, visual systems are less sensitive to high-frequency components in chrominants of a color image, the system provides a technique that allows one to enhance resolution of color imaging with a two-dimensional array with reduced image data.

All of the techniques described in this proposal may be implemented with two-dimensional amorphous silicon sensor arrays which are provided in commercially available products.

This invention has been described with reference to preferred and alternative embodiments. Obviously, modifications and alterations will occur to others upon reading and understanding of this specification. It is intended that all such modifications and alterations be included insofar as to come within the scope of the appended claims or the equivalence thereof.

Having thus described the invention, it is now claimed:

1. An enhanced resolution image scanner for generating a data signal representative of an image of an associated specimen wherein the data signal has a resolution greater than a resolution of a sensor array of the scanner, comprising:

an array of sensors wherein said sensors are relatively spaced by an interstice and disposed to generate a signal representative of a first subportion of a selected pixel of the associated specimen during a first scan, each said selected pixel having an area greater than said first subportion, and orientation means interposed between the specimen and the array for reorienting each of the sensors relative to the data signal of the associated specimen during a second scan for displacing the data signal as an undivided signal and generating a second signal representative of at least a second subportion of the selected pixel comprising an area of said specimen missed by the scanner array due to said interstice.

2. The enhanced resolution image scanner of claim 1 wherein the orientation means includes:

directing means for redirecting the image of the specimen relative to each of the sensors for generating the second signal therefrom with the second subportion comprising a different part of the selected pixel.

3. The enhanced resolution image scanner of claim 1 wherein the orientation means includes:

directing means for redirecting the image of the specimen relative to each of the sensors for generating the second signal relative to a different chrominant content of the selected pixel.

4. The enhanced resolution image scanner of claim 2 wherein the directing means is comprised of first and second rotating translucent wedges having a common optical axis disposed between pixels of the associated specimen and the sensor array; and wherein the image scanner further comprises, a first lens, sharing the common optical axis, disposed between the rotating translucent wedges and the associated specimen; and a second lens, sharing the common optical axis, disposed between the rotating translucent wedges and the sensor array.

5. The enhanced resolution image scanner of claim 4 further comprising a motor rotating the first rotating translucent wedge at a first angular velocity and the second rotating translucent wedge at a second angular velocity different from the first angular velocity.

6. The enhanced resolution image scanner of claim 2 wherein the directing means is comprised of:

first and second rotating mirrors disposed in an optical path between pixels of the associated specimen and the sensor array;

a first lens disposed to focus light from the associated specimen to the first rotating mirror; and a second lens disposed to focus light from the second rotating mirror to the sensor array.

7. The enhanced resolution image scanner of claim 6 further comprising a motor rotating the first rotating mirror at a first angular velocity and the second rotating mirror at a second angular velocity different from the first angular velocity.

8. The enhanced resolution image scanner of claim 2 wherein:

the directing means comprises a stepper for obtaining the second signal from a linearly displaced position along the associated specimen relative to a position generating the data signal of the first subportion of the selected pixel; and the stepper comprises a mechanical translator for selectively translating the image of the associated specimen relative to the sensor array.

9. The enhanced resolution scanner of claim 8 wherein the stepper comprises:

a first mirror;

a first lens for directing light reflected from the associated specimen to the first mirror;

a second lens;

a second mirror disposed to receive receiving light reflected from the first mirror for reflecting the light to the second lens;

the second lens focussing the light to the sensor array; and a translator pivoting at least one of the first and second mirrors on a selected axis to the displaced position.

10. The enhanced resolution image scanner of claim 9 wherein the stepper further comprises:

a projection lens for projecting an image of an associated specimen on to the sensor array; and a translator for displacing the projection lens laterally to the displaced position.

11. The enhanced resolution scanner of claim 3 wherein the orientation means further includes means for generating the second signal by selectively undersampling an enhancement content of the selected pixel of the associated specimen.

12. The enhanced resolution scanner of claim 1 wherein each sensor of the array has a selected orientation relative to each selected pixel such that the second signal is acquired by linearly displacing the sensor array relative to the specimen via the orientation means.

13. The enhanced resolution scanner of claim 12 wherein the linearly displacing is parallel to a linear array of the array of sensors.

14. The enhanced resolution scanner of claim 12 wherein the linearly displacing is at an angle relative to a linear array of the array of sensors.

15. The enhanced resolution scanner of claim 14 wherein the angle is chosen as generally 45°.

16. A method of obtaining enhanced scanned image data of a specimen comprising the steps of:

illuminating the specimen;

directing light from the illuminated specimen to a sensor array comprising a plurality of spaced sensor elements, wherein a first portion of a pixel of the specimen can be detected by the sensor elements;

selectively orienting the sensor elements relative to the associated specimen via a light director interposed between the specimen and the array;

generating a first signal representative of the first portion of the illuminated specimen by directing the light from the first portion on to the sensor array;

reorienting the sensor array relative to the specimen by redirecting the light as an undivided signal to the sensor array from a second portion comprising a portion of the specimen missed by the sensor array due to spacings of the spaced sensor elements; and generating a second signal representative of the second portion of the second pixel on the illuminated specimen.

17. The method of claim 16 wherein:

the step of selectively orienting further includes rotating first and second translucent wedges having a common optical axis disposed between the associated specimen and the sensor array wherein the rotating of the first translucent wedge is at a first angular velocity and the rotating of the second translucent wedge is at a second angular velocity different from the first angular velocity.

18. The method of claim 16 wherein the step of selectively orienting further includes:

rotating first and second mirrors having a common optical path disposed between the associated specimen and the sensor array wherein rotating the first mirror is at a first angular velocity and rotating the second mirror is at a second angular velocity different from the first angular velocity.

19. The method of claim 16 wherein the step of selectively orienting includes the steps of:

directing light reflected from the associated specimen to a first mirror;

receiving the light reflected from the first mirror to a second mirror from and reflecting the light to a second lens;

focussing the light reflected from the second mirror through the second lens to the sensor array; and pivoting at least one of the first and second mirrors on a selected axis to provide the second portion.

20. The method of claim 16 wherein the step of selectively orienting includes the steps of:

projecting, through a projection lens, an associated specimen on to the sensor array; and displacing, through a translator, the projection lens laterally to provide the second portion.

21. An enhanced resolution image scanner comprising:

an array of sensors, each sensor of the array adapted to generate a signal representative of a first subportion of a selected pixel of an associated specimen;

orientation means for selectively orienting each of the sensors relative to the associated specimen so as to generate a second signal representative of at least a second, unique subportion of each selected pixel in accordance with the relation:

$x = A \sin(2\pi f_1 t) + B \sin(2\pi f_2 + \Phi)$; and $y = A \cos(2\pi f_1 t) + B \cos(2f_d + \Phi)$; and wherein A and B represent amplitudes of trajectory and displacement and wherein $f_1$ and $f_2$ are the effective rotation frequencies of the sensors and the associated specimen, respectively;

wherein a section of parameters A, B, $\Phi$, $f_1$ and $f_2$ are such that the trajectory of the sensor position overlap to a pixel grid that has an enhanced resolution.

22. The enhanced resolution image scanner of claim 21 wherein the stepper is comprised of a mechanical translator for selectively translating the sensor array relative to the associated specimen, the orientation means including at least one of:

means for rotating at least one translucent wedge disposed in an optical path between the sensor array and the specimen; and means for rotating at least one mirror disposed in an optical path between the sensor array and the specimen.

23. The enhanced resolution image scanner of claim 22 wherein the stepper includes means for directing each of the sensors relative to the associated specimen to a next pixel displaced linearly adjacent to the selected pixel.

* * * * *